(12) United States Patent
Okawa

(10) Patent No.: US 9,219,926 B2
(45) Date of Patent: Dec. 22, 2015

(54) IMAGE ENCODING APPARATUS, IMAGE ENCODING METHOD AND PROGRAM, IMAGE DECODING APPARATUS, IMAGE DECODING METHOD AND PROGRAM

(71) Applicant: CANON KABUSHIKI KAISHA, Tokyo (JP)

(72) Inventor: Koji Okawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 457 days.

(21) Appl. No.: 13/662,039

(22) Filed: Oct. 26, 2012

(65) Prior Publication Data

US 2013/0107971 A1 May 2, 2013

(30) Foreign Application Priority Data

Oct. 31, 2011 (JP) ................................. 2011-239462

(51) Int. Cl.
*H04N 7/26* (2006.01)
*H04N 19/91* (2014.01)
*H04N 19/51* (2014.01)
*H04N 19/61* (2014.01)
*H04N 19/124* (2014.01)

(52) U.S. Cl.
CPC .............. *H04N 19/91* (2014.11); *H04N 19/124* (2014.11); *H04N 19/51* (2014.11); *H04N 19/61* (2014.11)

(58) Field of Classification Search
None
See application file for complete search history.

(56) References Cited

U.S. PATENT DOCUMENTS

| | | | | |
|---|---|---|---|---|
| 6,462,744 B1* | 10/2002 | Mochida et al. | .............. | 345/543 |
| 8,862,695 B2* | 10/2014 | Spracklen et al. | ............ | 709/217 |
| 2006/0050975 A1* | 3/2006 | Ito et al. | ........................ | 382/232 |
| 2007/0269118 A1* | 11/2007 | Sasaki et al. | .................. | 382/232 |
| 2009/0129471 A1* | 5/2009 | Kitajima | .................. | 375/240.16 |
| 2009/0168872 A1* | 7/2009 | Jeon et al. | ................ | 375/240.12 |
| 2010/0054339 A1* | 3/2010 | Schlanger et al. | ....... | 375/240.25 |
| 2010/0080304 A1* | 4/2010 | Reddy et al. | ............ | 375/240.26 |
| 2011/0211642 A1* | 9/2011 | Cho et al. | ................. | 375/240.16 |
| 2012/0236940 A1* | 9/2012 | Katzur et al. | ............ | 375/240.16 |
| 2013/0028271 A1* | 1/2013 | Limberg | ...................... | 370/479 |

* cited by examiner

*Primary Examiner* — Dave Czekaj
*Assistant Examiner* — Mohammad J. Rahman
(74) *Attorney, Agent, or Firm* — Canon USA, Inc. IP Division

(57) ABSTRACT

An image processing apparatus according to the present invention includes, a division unit configured to divide an image to generate a first block group including one or more blocks and a second block group adjacent to the first block group, a first encoding unit to encode the first block group in units of block, a second encoding unit to encode the second block group in units of block, and a storage unit to store encoded information after the first encoding unit processes a block at a predetermined position, in which the storage unit, when the first block group does not include a block at the predetermined position, sets the predetermined position to a block in the first block group and stores the encoded information based on the set position, and wherein the second encoding unit starts encoding based on the encoded information.

9 Claims, 14 Drawing Sheets

IMAGE ENCODING APPARATUS, IMAGE ENCODING METHOD AND PROGRAM, IMAGE DECODING APPARATUS, IMAGE DECODING METHOD AND PROGRAM

BACKGROUND OF THE INVENTION

1. Field of the Invention

The present invention relates to an image encoding apparatus, image encoding method and program, an image decoding apparatus, image decoding method and program, particularly, to entropy encoding/decoding in slice division.

2. Description of the Related Art

H.264/MPEG-4 AVC (hereafter, referred to as H.264) has been known as a coding method that is used to compress and record moving images. In H.264 (ITU-TH.264 (03/2010) Advanced video coding for generic audiovisual services), it is possible to divide an image into a plurality of slices and then encode the image. Dependency on data is small among the slices and encoding/decoding can be performed in parallel. One of the large advantages of slice division is to reduce the processing time by performing processes in parallel using a multi-core CPU.

The slices are encoded by the conventional binary arithmetic encoding which is adopted in the H.264. In other words, syntax elements such as mb_type and mb_qp_delta are binarized and binary signals are generated. The syntax elements are each provided with event probability in a table (hereafter, referred to as an event probability table) in advance and the binary signals are arithmetically encoded based on the event probability tables. Further, the event probability tables are updated for each encoding based on statistical information about whether the encoded binary signals are symbols with a high event probability.

Recently, a work for international standardization of a coding method that is more effective than the H.264 has been started and Joint Collaborative Team on Video Coding (JCT-VC) has been established between ISO/IEC and ITU-T. Standardization of the encoding method using High Efficiency Video Coding (hereafter, referred to as an HEVC) is in progress in the JCT-VC.

In standardization of HEVC, various coding methods are extensively examined to not only improve the encoding efficiency, but make mounting easy and reduce the processing time. A method for improving parallelism is also examined to reduce the processing time. In those methods, there is a method called Wavefront in which entropy encoding/decoding are performed in parallel (JCT-VC contribution JCTVC-F274.doc, internet address, <http://phenix.int-evry.fr/jct/doc_end_user/documents/6_Tor ino/wg11/>).

Since it is necessary to encode the binary signal of an encoding target using an event probability table that keeps updated, the processing cannot be performed unless resetting statistical information. However, resetting the statistical information deteriorates the encoding efficiency. On the other hand, the Wavefront applies the table of event probability when a plurality of blocks at positions designated in advance are encoded, to the block at the left end of the next line of the line to be processed. Accordingly, deterioration of the encoding efficiency is suppressed and blocks can be encoded in units of line in parallel. Although encoding in the Wavefront was described, decoding is performed in the same way.

However, even though it is possible to improve parallelism in units of line in the arithmetic encoding/decoding in the Wavefront, it is necessary to use the information of the encoded block at the position designated in advance, when encoding the block at the left end of the next line. Therefore, the block at the position designated in advance is necessary in the top line in a slice, such that the shapes of respective the slices are limited, when the slices and the Wavefront are combined.

SUMMARY OF THE INVENTION

The present invention is directed to encoding/decoding blocks in parallel in units of line without limiting the shape of slices, using the Wavefront.

According to an aspect of the present invention, an image encoding apparatus includes a division unit configured to divide an image to generate a first block group including one or more blocks and a second block group adjacent to the first block group, a first encoding unit to encode the first block group in units of block a second encoding unit to encode the second block group in units of block, and a storage unit to store encoded information after the first encoding unit processes a block at a predetermined position, in which the storage unit, when the first block group does not include a block at the predetermined position, sets the predetermined position to a block in the first block group and stores the encoded information based on the set position, and wherein the second encoding unit starts encoding based on the encoded information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
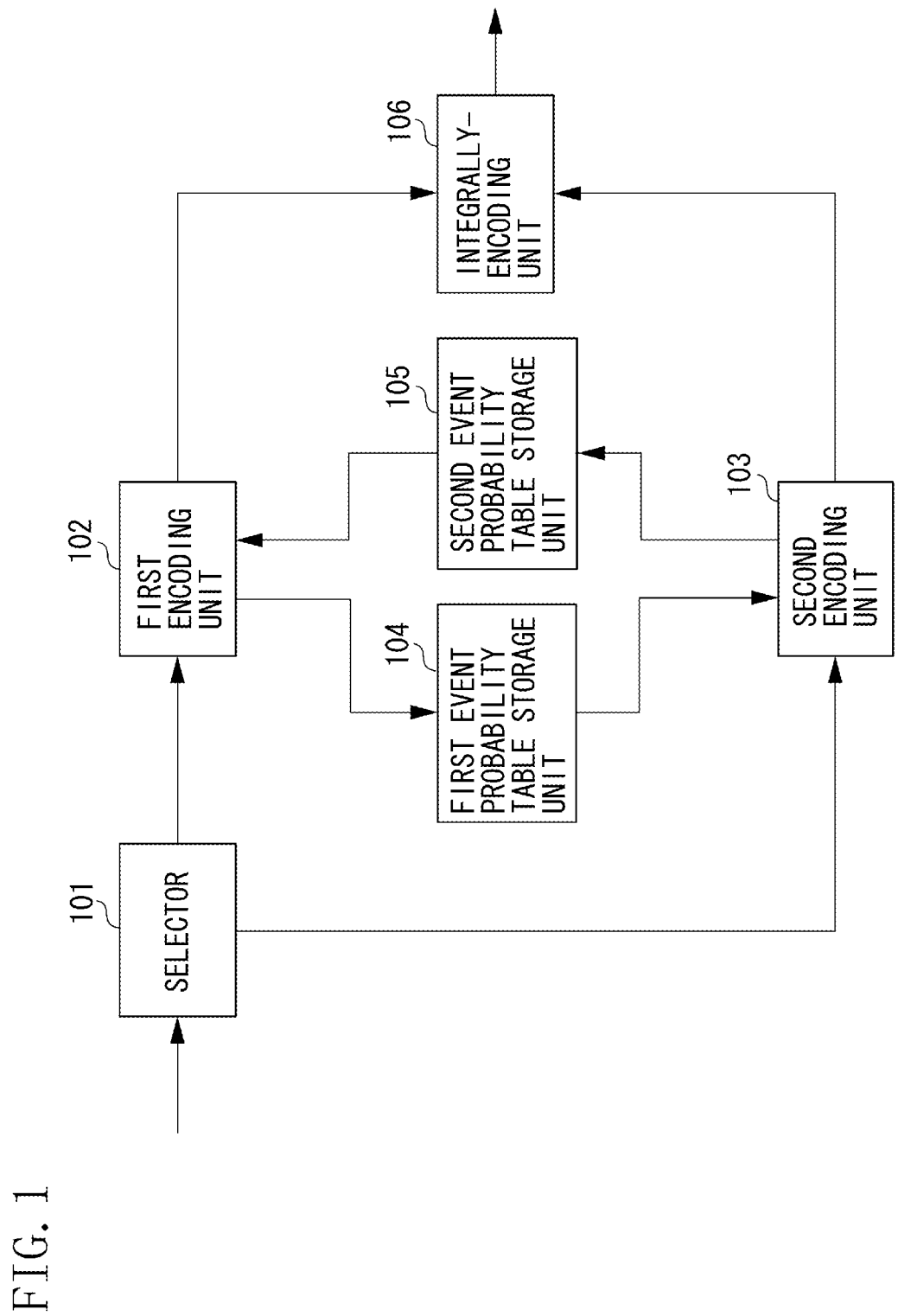
FIG. 1 is a block diagram illustrating the configuration of an image encoding apparatus according to a first exemplary embodiment.

Hereinafter, a first exemplary embodiment of the present invention will be described with reference to the drawings. FIG. 1 is a block diagram illustrating an image encoding apparatus according to the present exemplary embodiment.

Figure 2:
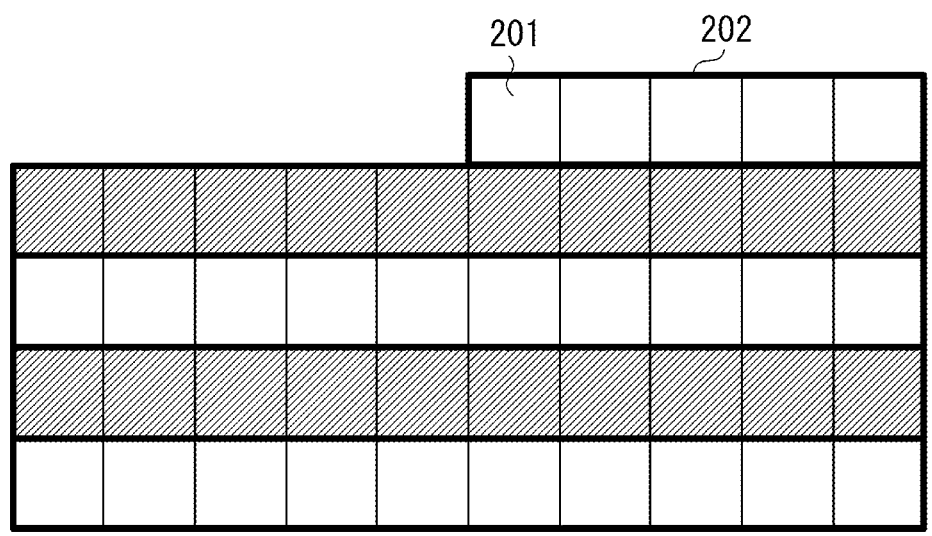
FIG. 2 is a diagram illustrating the configuration of block lines.
Figure 3:
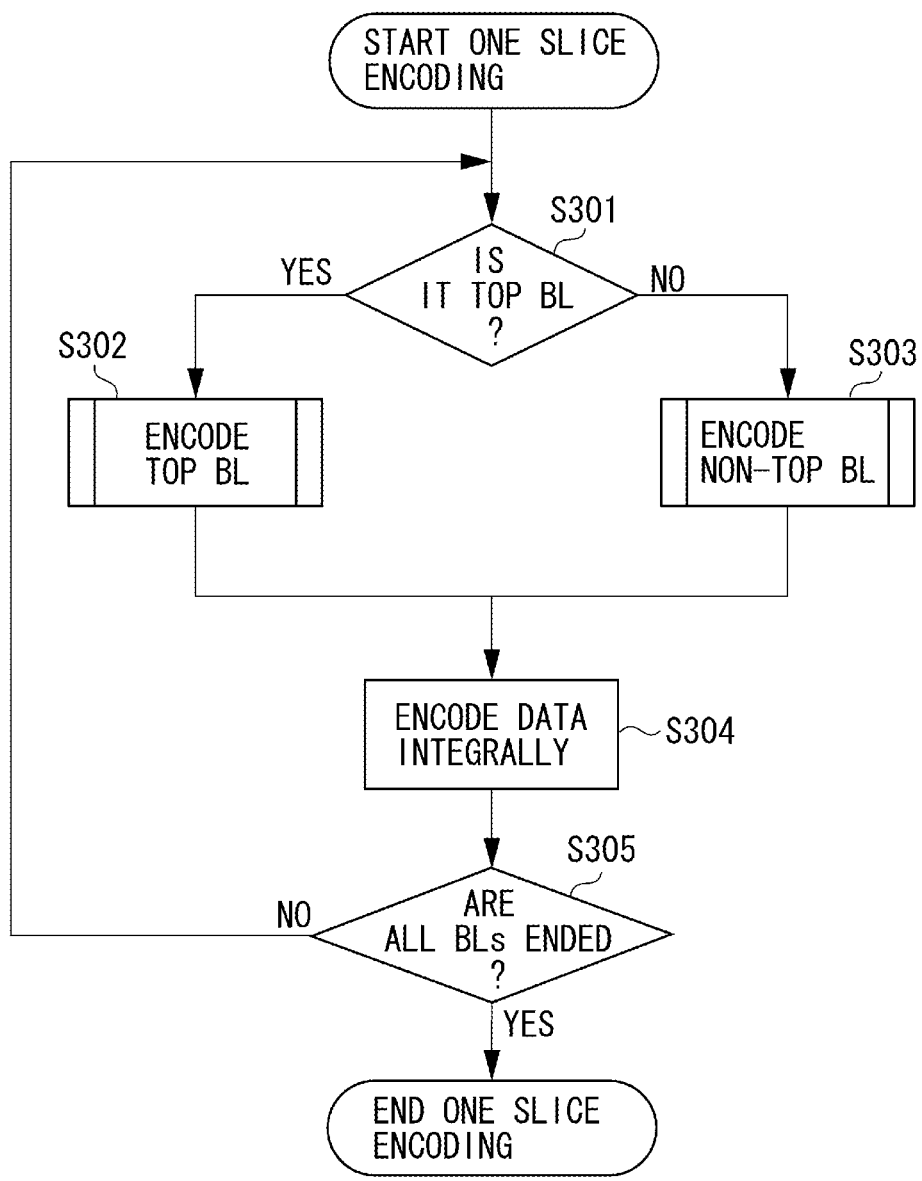
FIG. 3 is a flowchart illustrating encoding of a frame in the image encoding apparatus according to the first exemplary embodiment.

In FIG. 1, encoding units 102 and 103 encode blocks, which are obtained by dividing an input image into n×n pixels (n is a positive integer of 2 or more), in units of line, as illustrated in FIG. 2. The line of blocks is referred to as a block line hereafter. Although using two encoding units is described in the present exemplary embodiment, the present invention is not limited thereto. FIG. 2 illustrates a slice input to a selector 101. Square blocks 201 are indicated by fine lines and rectangular block lines 202 are indicated by heavy lines. The blocks in the white section (first block group) that indicates even-numbered block lines, including the block line at the top (zeroth line), are encoded by the first encoding unit 102. Further, the blocks in the hatched section (second block group) that indicates the odd-numbered block lines are encoded by the second encoding unit 103. The line at the top is referred to as a top block line hereafter.

Figure 8:
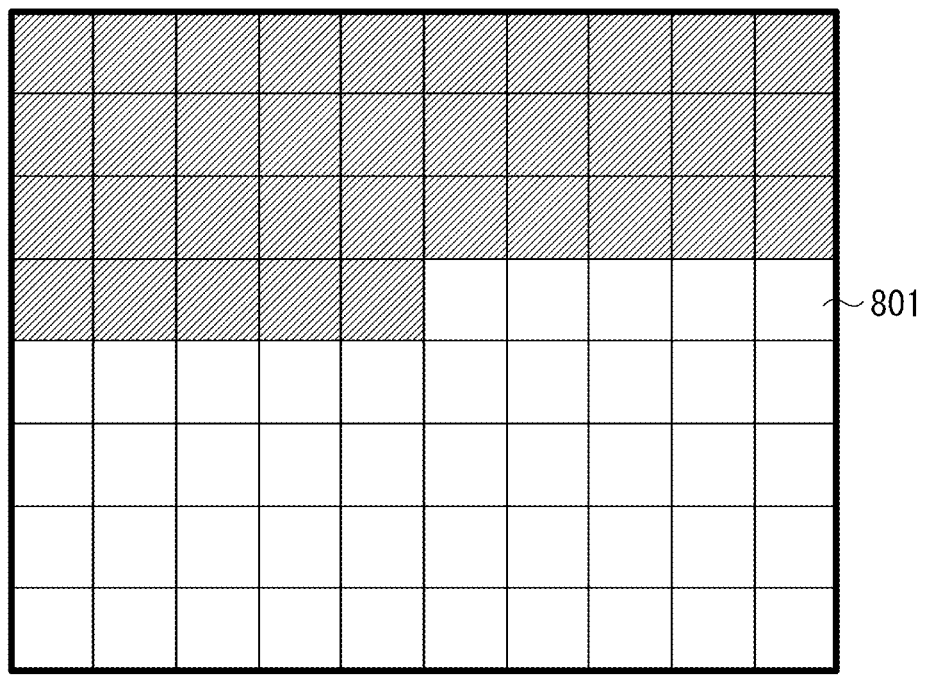
FIG. 8 is a diagram illustrating division of slices.

The selector 101 determines whether a processing target block is in the even-numbered block lines. Images in units of slice obtained by dividing a frame are input to the selector 101. If the block belongs to an even-numbered block line, the block is output to the first encoding unit 102, or if not so, the block is output to the second encoding unit 103. FIG. 8 illustrates the relationship between a slice input to the selector 101 and a frame. In the image illustrated in FIG. 8, the frame is divided into two slices. The rectangle indicated by the heavy line is the frame and the blocks in the hatched section and the white section respectively belong to different slices.

The encoding units 102 and 103, first, generate a prediction error for a encoding target block, through motion compensation referring to surrounding pixels or another frame and generate transformation coefficients by performing orthogonal transformation. Next, the encoding units determine quantization parameters for the transformation coefficients obtained by the orthogonal transformation, and generate quantization coefficients by quantizing the transformation coefficients. Subsequently, the encoding units generate binary signals by binarizing syntax elements including the quantization coefficients. The syntax elements are each provided with event probability as an event probability table in advance and the binary signals are arithmetically encoded based on the event probability tables. Further, the event probability tables are updated for each encoding based on statistical information as to whether the encoded binary signals are symbols with a high event probability.

A first event probability table storage unit 104 holds the event probability table generated by the first encoding unit 102. Hereafter, the event probability table stored in the first event probability table storage unit 104 is referred to as a first event probability table.

A second event probability table storage unit 105 holds the event probability table generated by the second encoding unit 103. Hereafter, the event probability table stored in the second event probability table storage unit is referred to as a second event probability table.

An integrally-encoding unit 106 integrates code data generated by the first encoding unit 102 and code data generated by the second encoding unit 103 and outputs the integrated data as a bit stream.

The operation of the image encoding apparatus of the present exemplary embodiment will be described in detail with reference to the flowcharts illustrated in FIGS. 3 to 6. In the present exemplary embodiment, moving image data is input in units of slice obtained by dividing a frame and is divided into blocks to be processed in the order of raster. Although the moving image data is input in units of slice in the present exemplary embodiment, a still image data equivalent to one frame may be input, or the moving image data may be input in units of frame. Further, although only the intra prediction encoding is described for the sake of simplicity of description in the present exemplary embodiment, the present invention is not limited thereto and may be applied to the inter prediction encoding.

First, in step S301, whether a processing target block is in the top block line is determined. If the block is in the top block line (Yes in step S301), the operation proceeds to step S302, or if not so (No in step S301), the operation proceeds to step S303. The top block line means the top of a slice, and the positional relationship with the blocks in other slices is not taking into account. Specifically, the block line to which a block 801 belongs is the top block line in the slice in the white section illustrated in FIG. 8.

The processing in step S302 performs processing of encoding the top block line and the details are described below. The processing in step S303 is encoding the block lines, except for the top block line, and similarly, the details are described below. Further, the selector 101 determines whether a block line to which a processing target block belongs is an even-numbered or odd-numbered block line, with the top block line as the zeroth block line. In a case of an even-numbered block line, the block line is encoded by the first encoding unit 102, otherwise, the block line is encoded by the second encoding unit 103.

Next, in step S304, the integrally-encoding unit 106 integrates the code data output from the first encoding unit 102 and the code data output from the second encoding unit 103 and generates and outputs a bit stream.

Thereafter, in step S305, whether all the block lines in a processing target slice have been encoded is determined. If it is determined that all the block lines have been encoded (Yes in step S305), encoding of one slice is ended, or if not so (No in step S305), the operation proceeds to step S301 and the next block line is encoded.

The processing in step S302 (a process of encoding the top block line) will be described in detail with reference to the flowchart illustrated in FIG. 4. Since the top block line is an even-numbered block line, a processing target block is input to the first encoding unit 102 by the selector 101 and then encoded.

First, a storage flag F is initialized to 0 in step S401. The storage flag F is a flag indicating whether the event probability table is stored.

Next, in step S402, the event probability table is initialized by a predetermined method. The initialized event probability table is used to arithmetically encode the first binary signal of the block at the left end of a block line and updated as needed in step S403, which is described below. Hereafter, the event probability data that is used to arithmetically encode the first binary signal in a block line is referred to as a block line reference event probability table.

Next, in step S403, pixel data in units of block are encoded by the first encoding unit 102.

Although the blocks are composed of 64×64 pixels in the present exemplary embodiment, the present invention is not limited thereto and the sizes of the blocks may be small such as 32×32 pixels or may be large such as 128×128 pixels. The block encoding in step S403 will be described in detail with reference to the flowchart illustrated in FIG. 6.

First, in step S601, a prediction error is generated by performing intra prediction on an input image block using pixels surrounding the block.

Next, in step S602, a transformation coefficient is generated by performing orthogonal transformation on the prediction error. Further, the transformation coefficient is quantized by using a quantization parameter (hereafter, referred to as a block quantization parameter) determined based on the characteristics of an image or the coding amount, thereby generating a quantization coefficient.

Next, in step S603, a binary signal is generated by binarizing the quantization parameter or each of syntax elements such as a prediction mode. Various binarizing methods such as unary/binarization or fixed-length binarization are alternatively used for each of the syntax elements, similar to H.264. Further, the binary signal is arithmetically encoded based on the event probability table.

Next, in step S604, the event probability table is updated based on whether the arithmetically encoded binary signal is a symbol with a high probability.

Next, in step S605, whether all the syntax elements in the block have been arithmetically encoded is determined. If it is determined that all the syntax elements have been encoded (Yes in step S605), the block encoding is ended, or if not so (No in step S605), the operation proceeds to step S603.

Figure 4:
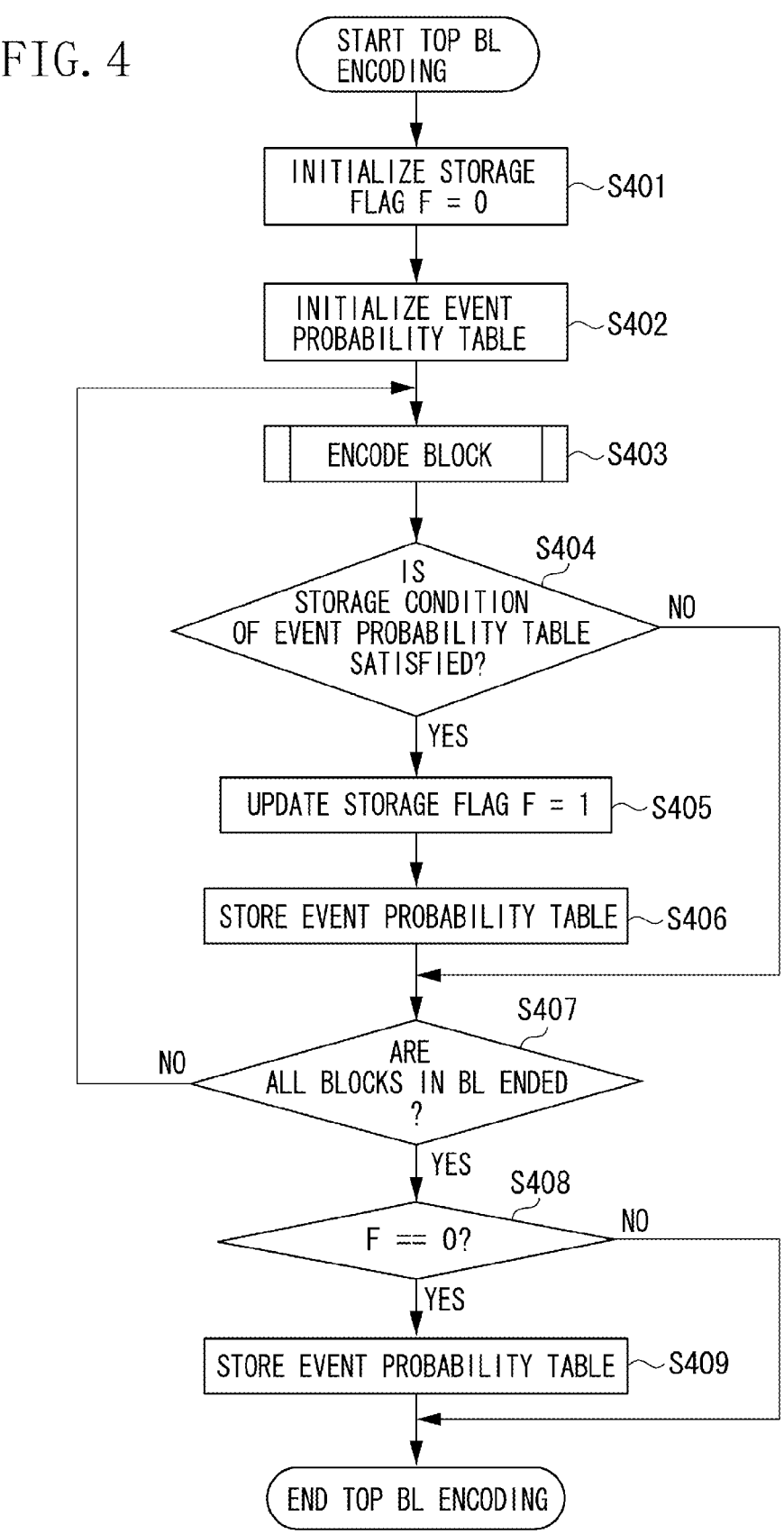
FIG. 4 is a flowchart illustrating encoding of the block line at the top in the image encoding apparatus according to the first exemplary embodiment.

Returning to the flowchart illustrated in FIG. 4, in step S404, whether the condition for storing an event probability table is satisfied is determined. In the present exemplary embodiment, the condition for storing an event probability table is whether the block encoded in step S403 is a predetermined numbered block from the left end of the frame. Hereafter, the predetermined number that is the condition for storing the event probability table is referred to as storage condition number.

The operation proceeds to step S405 if the condition is satisfied (Yes in step S404), or the operation proceeds to step S407 if the condition is not satisfied (No in step S404). Although the storage condition number is a predetermined number from the left end of a frame in the present exemplary embodiment, the present invention is not limited thereto. For example, there may be no block at the left end of a frame in a block line, such as in the block line 202 illustrated in FIG. 2. In this case, a predetermined number from the left end of the frame may be the storage condition number or a predetermined number from the left end of the block line may be the storage condition number.

Next, instep S405, the storage flag F is updated into 1. Thereafter, in step S406, the event probability table is stored as a first event probability table in the first event probability table storage unit 104. The first event probability table is used as the block line reference probability table when the block at the left end of the next block line is encoded.

Next, in step S407, whether all the blocks in a processing target block line have been encoded is determined. If it is determined that all the blocks have been encoded (Yes in step S407), the operation proceeds to step S408, or if not so (No in step S407), the operation proceeds to step S403 and the next block is encoded in the order of raster.

Next, in step S408, whether the value of the storage flag F is 0 is determined. The value 0 of the storage flag F indicates that the event probability table storage conditions in step S404 have never been satisfied. In other words, it means that there has been no block that satisfies the storage condition number in the top block line. The number of blocks in the top block line needs to be larger than the difference between the number of blocks in the horizontal direction of the frame and the storage condition number so that a block satisfying the storage condition number exists in the top block line.

Hereafter, the number of blocks which is required for existence of a block satisfying the storage condition number in the top block line is referred to as the number of necessary blocks. For example, when the storage condition number is 4 and the number of blocks in the horizontal direction of the frame is 10, the number of necessary blocks is 10−4+1=7. When the storage condition number is a predetermined number from the left end of the block line, the number of necessary blocks is the same value as the storage condition number. If the value of the storage flag F is 0 (Yes in step S408), the operation proceeds to step S409, or if not so (No in step S408), the encoding of the top block line is ended.

Thereafter, in step S409, the event probability table is stored as a first event probability table in the first event probability table storage unit 104, and then the encoding of the top block line is ended. In step S409, the event probability table when the block encoding at the right end of the block line is ended is stored.

Figure 5:
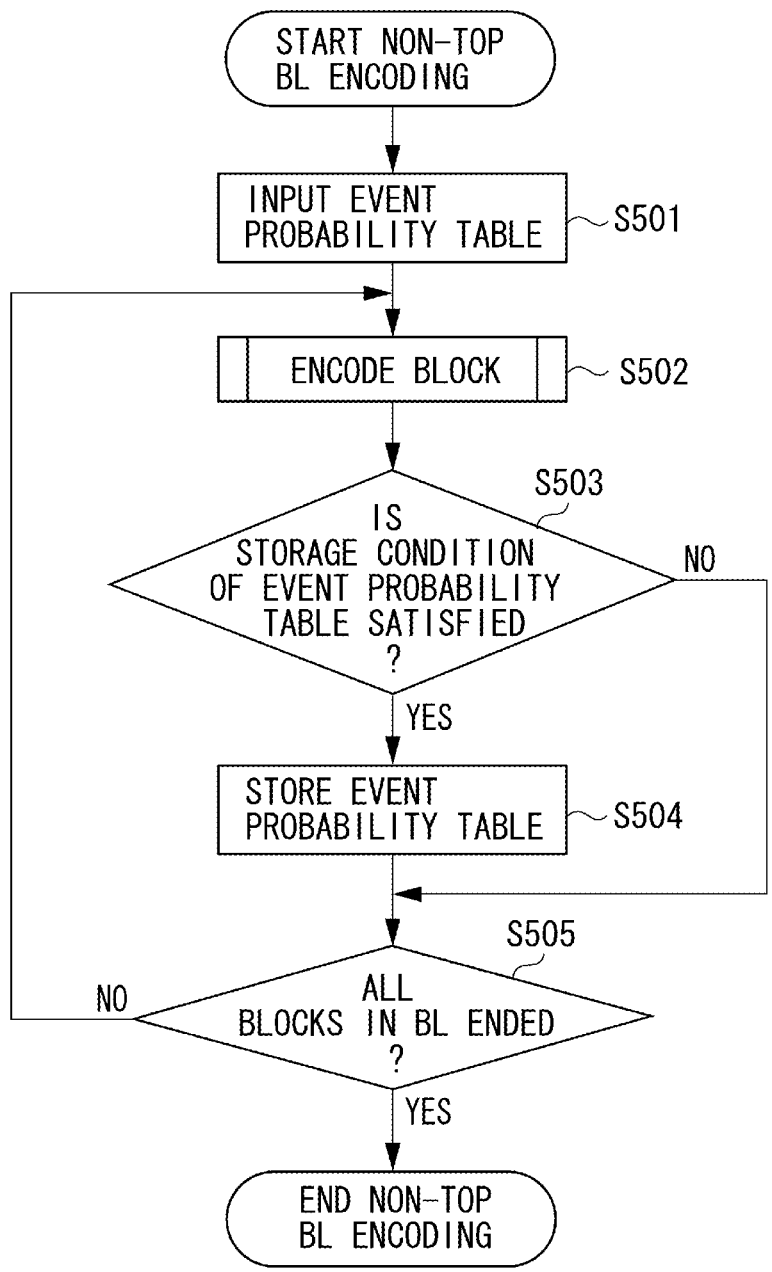
FIG. 5 is a flowchart illustrating encoding of the block lines except for the top block line in the image encoding apparatus according to the first exemplary embodiment.
Figure 6:
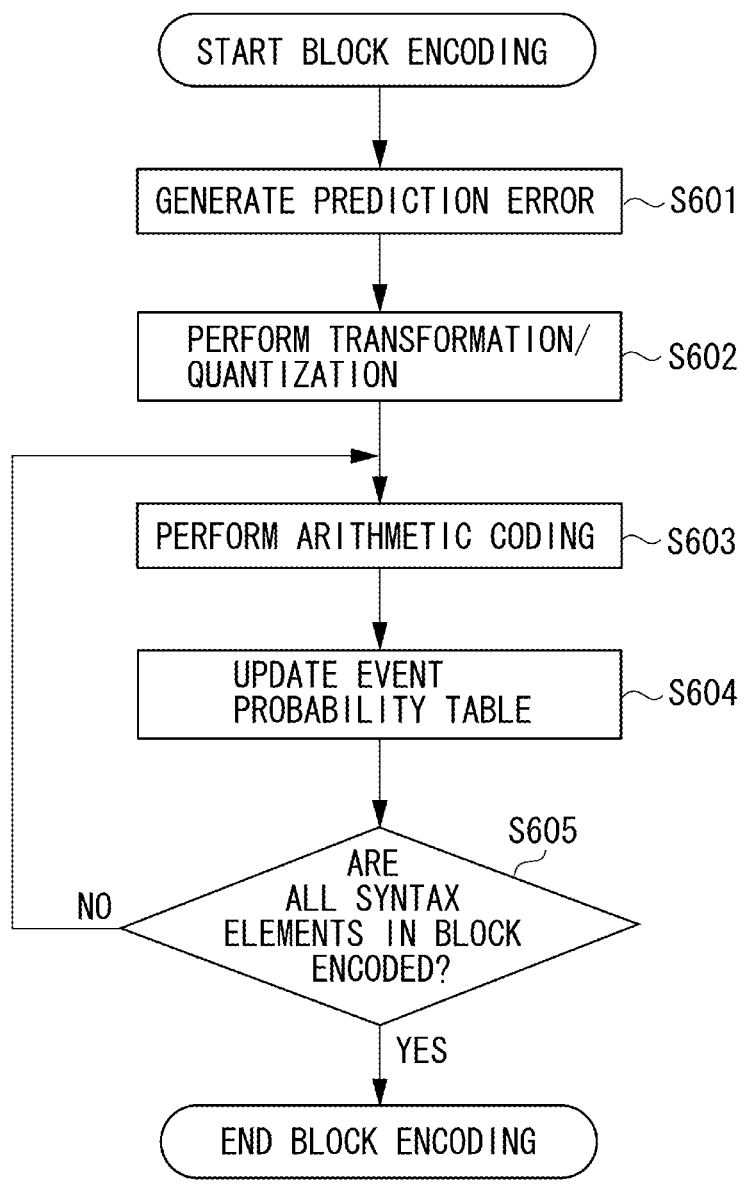
FIG. 6 is a flowchart illustrating encoding of a block in the image encoding apparatus according to the first exemplary embodiment.

On the other hand, the processing in step S303 (a process of encoding other block lines except for the top block line) is described in detail with reference to the flowchart illustrated in FIG. 5. Whether each of the block lines is even-numbered block line is determined by the selector 101. When a block line is an even-numbered block line, the image of a processing target block is input to the first encoding unit 102 and then encoded. When a block line is an odd-numbered block line, the image of a processing target block is input to the second encoding unit 103 and then encoded. The flow when an odd-numbered block line is encoded by the second encoding unit 103 will be described first.

First, in step S501, the first event probability table is input as a block line reference event probability table from the first event probability table storage unit 104.

Since the processing in steps S502, S503, and S505 is the same as that in steps S403, S404, and S407, the description is omitted.

In the processing of step S504, an event probability table is stored as a second event probability table to the second event probability table storage unit 105. The second event probability table is used as the block line reference probability table when the block at the left end of the next block line is arithmetically encoded.

Subsequently, the flow when an even-numbered block line is encoded by the first encoding unit 102 will be described.

First, in the processing of step S501, the second event probability table is input as a block line reference event probability table from the second event probability table storage unit 105.

Since the processing in steps S502, S503, S504, and S505 is the same as that in steps S403, S404, S406, and S407, the description is omitted.

According to the configuration and operation described above, even if the number of blocks belonging to the top block line in a slice is smaller than the number of necessary blocks, it is possible to encode the block at the left end of the second block line by referring to the event probability table of the block at the right end of the top block line.

Figure 7:
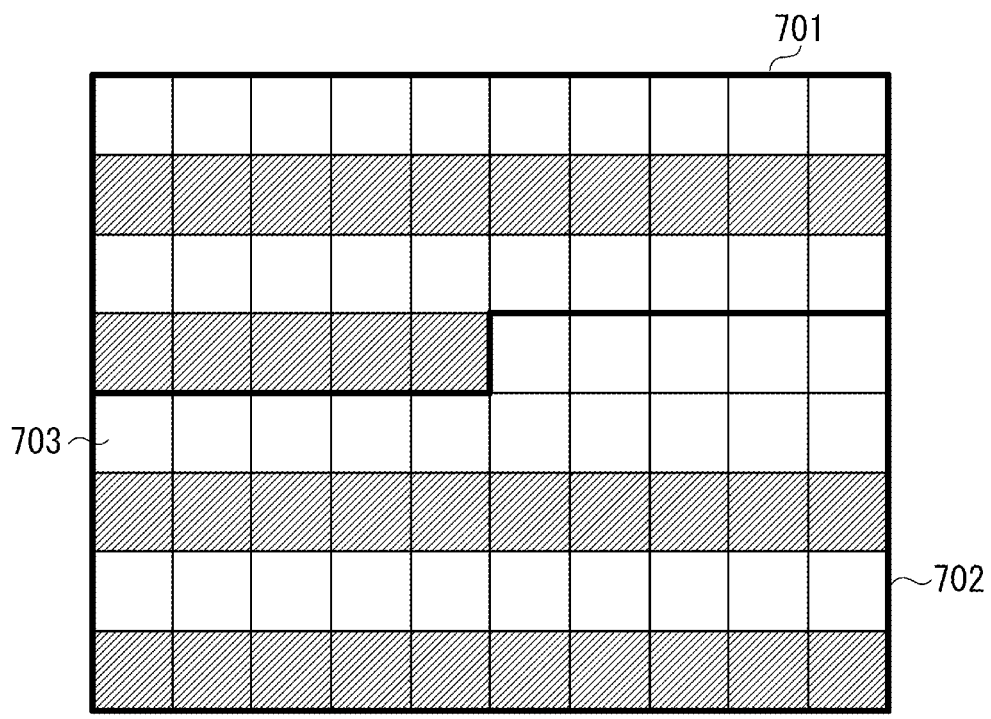
FIG. 7 is a diagram illustrating integration of the block line at the top and the second block line from the top.

Further, in the present exemplary embodiment, when the number of blocks belonging to the top block line of a slice is smaller than the number of necessary blocks, the event probability of the block at the right end is used as the block line reference probability table of the block line when the block at the left end of the next line is encoded. However, the present invention is not limited thereto as long as the configuration does not limit the shape of the slice. For example, when the number of blocks in the top block line of a slice is smaller than the storage condition number, an event probability table that has been initialized in advance may be the block line reference event probability table of the next block line. In addition, when the number of blocks in the top block line of a slice is smaller than the number of necessary blocks, the event probability table when an arbitrary block in the block line of the slice is encoded may be the block line reference event probability table of the next block line. Further, when the number of blocks in the top block line of a slice is smaller than the number of necessary blocks, both of the top block line and the second block line may be integrated and encoded by the first encoding unit 102. FIG. 7 illustrates integration of block lines. A frame is divided into two slices in FIG. 7. The sections indicated by heavy lines are slices, in which the slice 701 is the upper slice and the slice 702 is the lower slice. The rectangles indicated by fine lines are blocks. The blocks in the white section are encoded by the first encoding unit 102 and the blocks in the hatched section are encoded by the second encoding unit 103. In this configuration, assume that the storage condition number is 5 and the number of blocks in the horizontal direction of the frame is 10. The value of the difference between the number of blocks in the horizontal direction of the frame and the storage condition number is 5 and blocks more than the value are necessary in the top block line, such that the number of necessary blocks is 6. However, blocks in the top block line of the slice 702 are less than the number of the necessary blocks. Accordingly, by integrating the block lines, blocks included in the integrated block lines are more than the number of the necessary blocks. Further, with the integrated block lines as the top block line, the event probability table when the block corresponding to the number of necessary blocks in the order of rater is encoded may be the block line reference event probability table of the next block line. When the number of necessary blocks is 6, the event probability table when the block 703 that is the sixth block in the slice 702 in the order of raster is encoded is the block line reference event probability table of the next block line.

Although the arithmetic encoding is used for the entropy encoding in the present exemplary embodiment, the present invention is not limited thereto. The any encoding method may be used as long as an encoding method uses the statistical information for entropy encoding of the block at the left end of the next block line while a block line is encoded, when entropy encoding is performed based on statistical information such as the event probability table.

Further, although it is described in the present exemplary embodiment that two encoding units are provided, it is apparent that parallel processing can be performed by more encoding units by providing a third encoding unit and a third event probability table storage unit.

Figure 9:
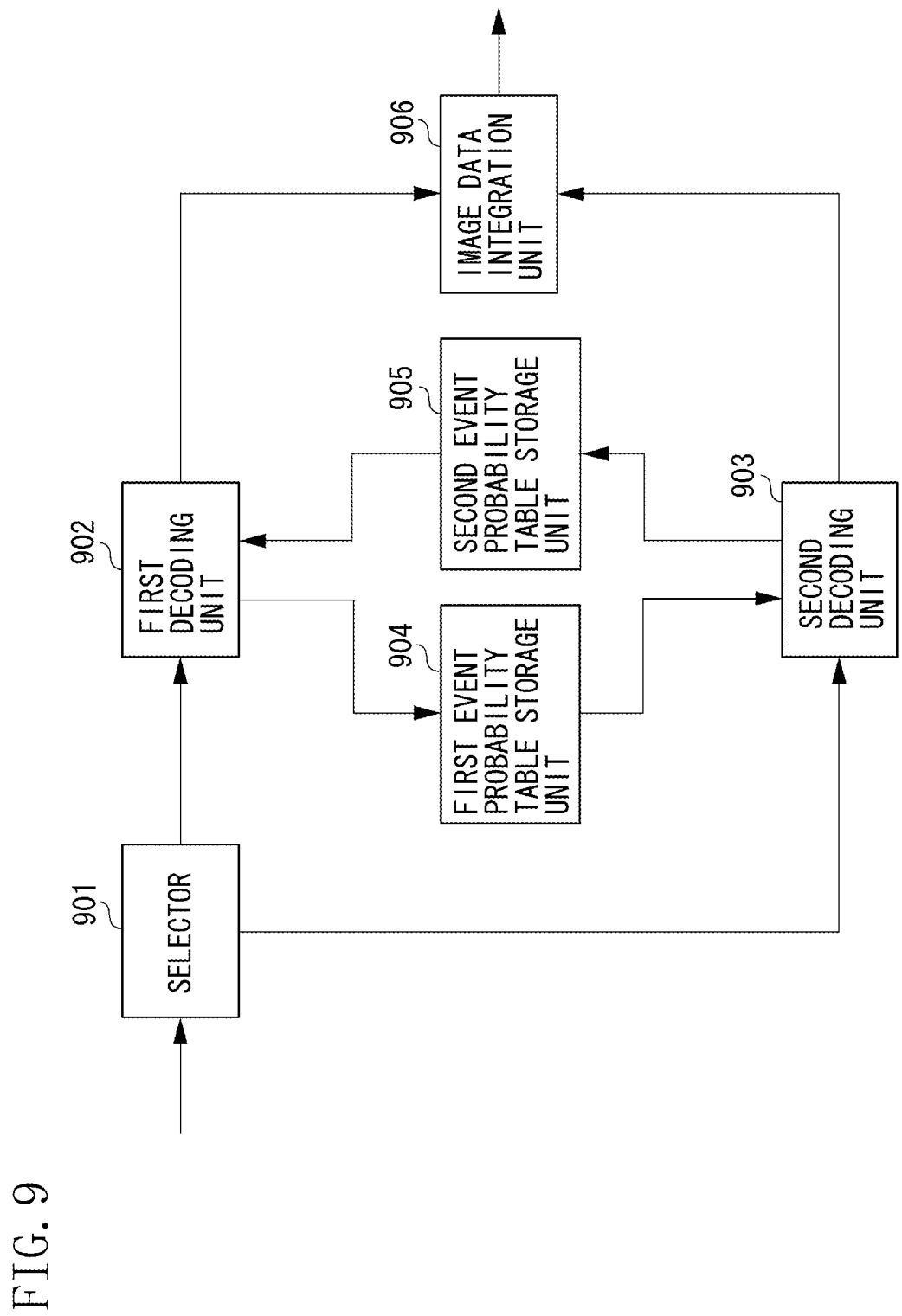
FIG. 9 is a block diagram illustrating the configuration of an image decoding apparatus according to a second exemplary embodiment.
Figure 10:
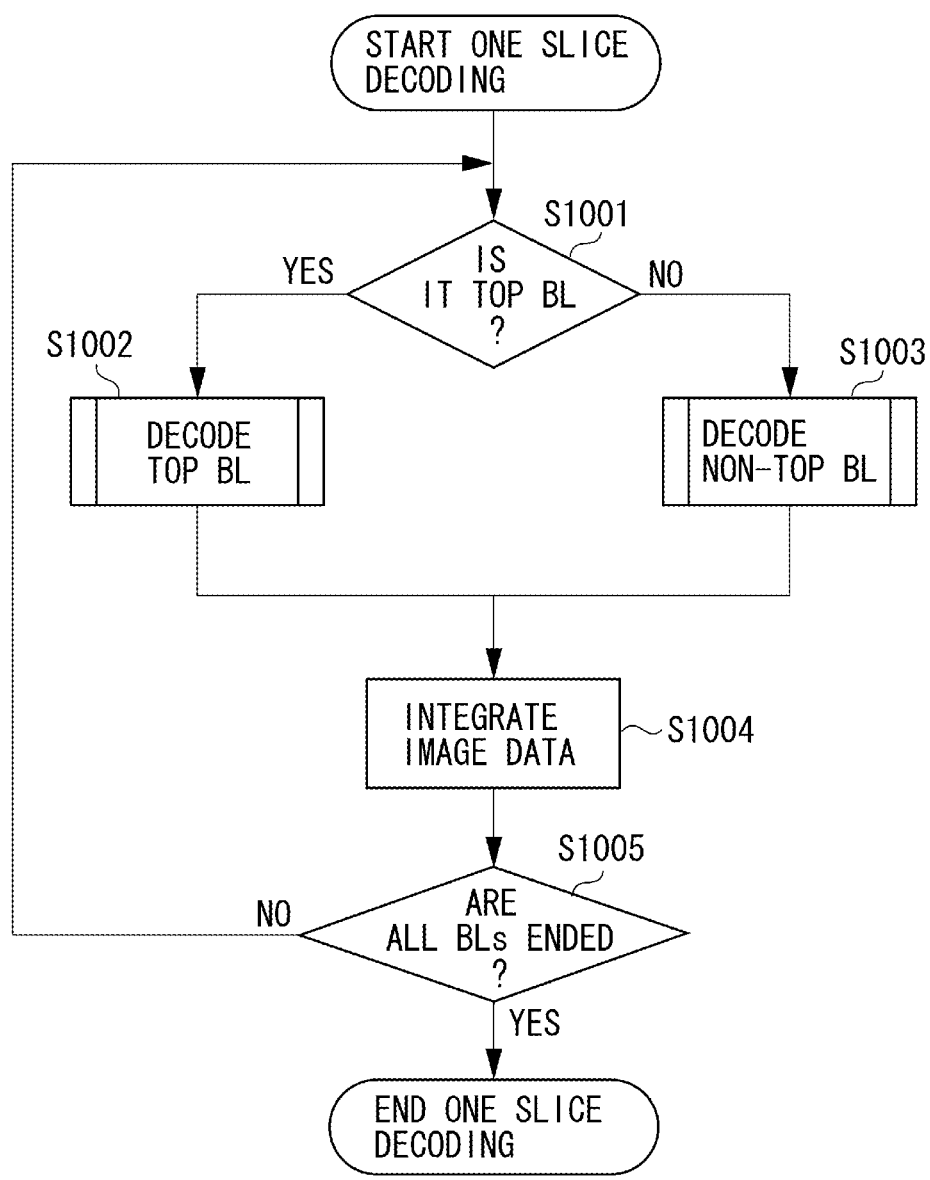
FIG. 10 is a flowchart illustrating decoding of a frame in the image decoding apparatus according to the second exemplary embodiment.

Hereinafter, a second exemplary embodiment of the present invention will be described with reference to the drawings. FIG. 9 is a block diagram illustrating an image decoding apparatus according to the present exemplary embodiment.

In FIG. 9, a selector 901 determines whether a processing target block belongs to the even-numbered block lines. Bit streams are input in units of slice to the selector 901. If a block belongs to an even-numbered block line, division data obtained by dividing the bit stream is output to a first decoding unit 902, or if not so, division data obtained by dividing the bit stream is output to a second decoding unit 903.

The decoding units 902 and 903 decode input bit streams in units of block line, as illustrated in FIG. 2. Although two decoding units are used in the present exemplary embodiment, the present invention is not limited thereto. In FIG. 2, the blocks in the white part that indicate even-numbered block lines, including the block line at the top (zeroth line) are decoded by the first decoding unit 902 and the blocks in the hatched part that indicate odd-numbered block lines are decoded by the second decoding unit 903. Hereafter, similar to the encoding apparatus of the first exemplary embodiment, the block line at the top is referred to as a top block line.

In each of the decoding units, an event probability table is selected for a binary signal of a decoding target bit stream, and then a quantization coefficient is generated by performing arithmetic decoding based on the event probability table. Next, a transformation coefficient is generated by performing inverse quantization on the quantization coefficient based on a quantization parameter. Next, a prediction error is generated by performing inverse orthogonal transformation on the transformation coefficient. Thereafter, image data of a decoding target block is generated by performing motion compensation referring to pixels surrounding the decoding target block or another frame.

A first event probability table storage unit 904 holds the event probability table generated by the first decoding unit 902.

A second event probability table storage unit 905 holds the event probability table generated by the second decoding unit 903.

An image data integration unit 906 forms the image data generated by the first decoding unit 902 and the second decoding unit 903, and outputs the formed data.

The operation of the image decoding apparatus of the present exemplary embodiment will be described in detail with reference to the flowcharts illustrated in FIGS. 10 to 13. In the present exemplary embodiment, a bit stream is input in units of slice obtained by dividing a frame, and the bit stream is divided into code data in units of block and then decoded. Although the bit stream is input in units of slice in the present exemplary embodiment, the bit stream may be input in unit of frame. Further, although only intra prediction decoding is described for the sake of simplicity of description in the present exemplary embodiment, the present invention is not limited thereto and may be applied to inter prediction decoding.

First, in step S1001, the selector 901 determines whether a processing target block is in the top block line. In the present exemplary embodiment, the selector 901 determines whether a block is in the block line at the top, based on the result of analyzing syntax elements of a higher layer such as slice headers or a Picture Parameter Set (hereafter, referred to as PPS), or the number of decoded blocks. However, the present invention is not limited thereto. For example, identifiers may be provided in advance at the segment ends of the blocks lines in the input bit stream to determine whether the block lines are even-numbered lines based on the identifiers. Further, the information about the size of the bit stream of each block line or the start position of the next block line may be provided to determine whether the block lines are even-numbered lines based on the information. Further, there is a process of determining whether a block lines is an even-numbered line in step S1003 to be described below, the information for the determination is the same as that in step S1001. If the block is in the top block line (Yes in step S1001), the process proceeds to step S1002, or if not so (No in step S1001), the process proceeds to step S1003. Similar to the encoding apparatus according to the first exemplary embodiment, the top block line means the top of a slice, and the positional relationship with the blocks in other slices is not taking into account. Specifically, the block line to which a block 801 belongs is the top block line in the slice in the white section illustrated in FIG. 8.

The processing in step S1002 is decoding the top block line and the details will be described below. The processing in step S1003 is decoding the block lines, except for the top block line, and similarly, the details will be described below.

Next, in step S1004, the image data integration unit 906 integrates the image data output from the first decoding unit 902 and the second decoding unit 903, and generates and outputs a decoded image.

Thereafter, in step S1005, it is determined whether all the block lines in a processing target slice have been decoded. If they have been decoded (Yes in step S1005), the decoding of one slice is ended, or if not so (No in step S1005), the operation proceeds to step S1001 and the next block line is decoded.

The processing in step S1002 (a process of decoding the top block line) will be described in detail with reference to the flowchart illustrated in FIG. 11. Since the top block line is an even-numbered block line, the code data of a target block line is input to the first decoding unit 902 by the selector 901 and then decoded.

Figure 11:
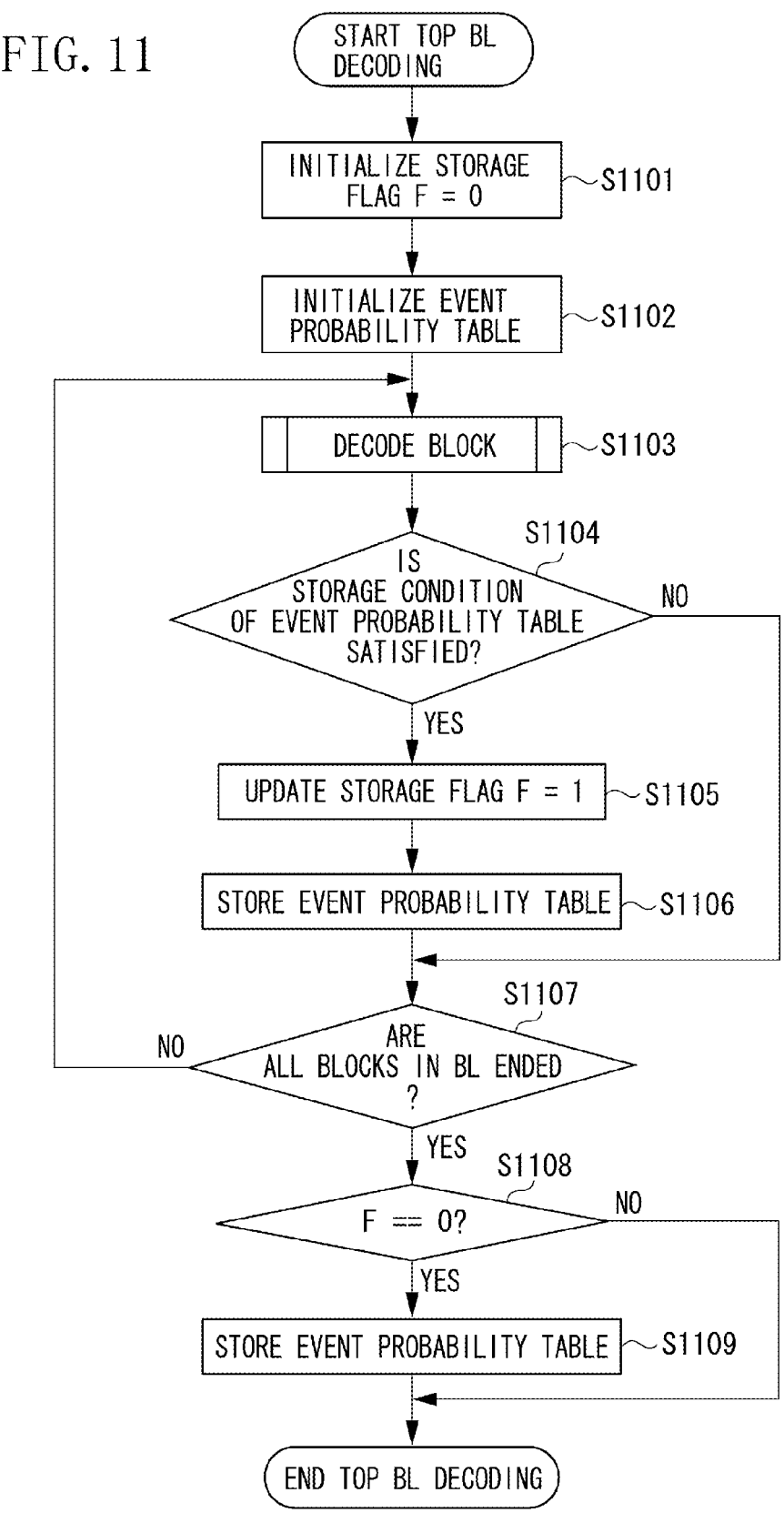
FIG. 11 is a flowchart illustrating decoding of the block line at the top in the image decoding apparatus according to the second exemplary embodiment.

First, in step S1101 in FIG. 11, a storage flag F is initialized to 0. The storage flag F is a flag indicating whether the event probability table is stored. Next, in step S1102, the event probability table is initialized by a predetermined method. The initialized event probability table is used to arithmetically decode the initial binary signal of the block at the left end of a block line and updated in step S1103 as needed, which is described below. Hereafter, the event probability data that is used to arithmetically decode the first binary signal in a block line is referred to as a block line reference event probability table, similar to the encoding apparatus according to the first exemplary embodiment.

Next, in step S1103, the bit stream is decoded in units of block by the first decoding unit 902 and pixel data is generated.

Although the blocks are composed of 64×64 pixels, the present invention is not limited thereto and the sizes of the blocks may be small such as 32×32 or may be large such as 128×128. Decoding processing of the block in step S1103 will be described in detail with reference to the flowchart illustrated in FIG. 13.

First, in step S1301, a bit stream is arithmetically decoded on the basis of the event probability table, such that a binary signal is generated. Further, similar to H.264, the binary signal, which is binarized by various binarizing methods such as unary/binarization or fixed-length binarization are decoded for each of the syntax elements, such that syntax elements including a quantization coefficient are generated.

Next, in step S1302, the event probability table is updated on the basis of whether the arithmetically decoded binary signal is a symbol with a high probability.

Next, in step S1303, whether all the syntax elements in the block have been arithmetically decoded is determined. If all the syntax elements are arithmetically decoded (Yes in step S1303), the operation proceeds to step S1304, or if not so (No in step S1303), the operation proceeds to step S1301.

Next, in step S1304, the quantization coefficient is inversely quantized and a transformation coefficient is generated. Further, a prediction error is generated by applying inverse orthogonal transformation to the transformation coefficient.

Next, in step S1305, a prediction image is generated by intra prediction from pixels around the processing target block. Further, image data is generated in units of block by adding the prediction error to the prediction image.

Returning to the flowchart illustrated in FIG. 11, in step S1104, whether the conditions for storing an event probability table are satisfied is determined. In the present exemplary embodiment, the condition for storing an event probability table is whether the block decoded in step S1103 is a predetermined numbered block from the left end of the frame. Hereafter, the predetermined number that is the condition for storing the event probability table is referred to as the storage condition number, similar to the encoding apparatus according to the first exemplary embodiment. Although the storage condition number is a predetermined number from the left end of a frame in the present exemplary embodiment, the present invention is not limited thereto. For example, there may be no block at the left end of a frame in a block line, such as in the block line 202 illustrated in FIG. 2. In this case, a predetermined number from the left end of the frame may be the storage condition number or a predetermined number from the left end of the block line may be the storage condition number. Further, the present exemplary embodiment assumes that the storage condition number is encoded in advance as a syntax element of a higher layer such as the slice header or the PPS. However, the present invention is not limited thereto and the number of storage conditions may be a fixed number, not depending on the bit stream. The operation proceeds to step S1105, if the condition is satisfied (Yes in step S1104), or the operation proceeds to step S1107, if the conditions are not satisfied (No in step S1104).

In step S1105, the storage flag F is updated to 1. Thereafter, in step S1106, the event probability table is stored as a first event probability table in the first event probability table storage unit 904. The first event probability table is used as the block line reference probability table when the block at the left end of the next block line is decoded.

Next, in step S1107, it is determined whether all the blocks in a target block line have been decoded. If all the blocks have been decoded (Yes in step S1107), the operation proceeds to step S1108, or if not so (No in step S1107), the operation proceeds to step S1103 and the next block is decoded in the order of raster.

Next, in step S1108, whether the value of the storage flag F is 0 is determined. The value 0 of the storage flag F indicates that the event probability table storage conditions in step S1104 has never been satisfied. In other words, it means that there has been no block that satisfies the storage condition number in the top block line. The number of blocks belonging to the top block line needs to be larger than the difference between the number of blocks in the horizontal direction of the frame and the storage condition number so that a block satisfying the storage condition number exists in the top block line. Hereafter, the number of blocks which is required for existence of a block satisfying the storage condition number in the top block line is referred to as the number of necessary blocks. For example, when the storage condition number is 4 and the number of blocks in the horizontal direction of the frame is 10, the number of necessary blocks is 10−4+1=7. When the storage condition number is a predetermined number from the left end of the block line, the number of necessary blocks is the value as the same as the storage condition number. If the value of the storage flag F is 0 (Yes in step S1108), the process proceeds to step S1109, or if the value of the storage flag F is not 0 (No in step S1108), the decoding of the top block line is ended. In the present exemplary embodiment, whether the number of blocks belonging to the top block line is less than the number of blocks is determined by the storage flag F. However, the present exemplary embodiment is not limited thereto. For example, it may be possible to calculate the spatial position of the first block of the slice in the frame by analyzing the header of the code data in units of slice, and determine whether the number of blocks belonging to the top block line is less than the storage condition number on the basis of the spatial position and the transverse width of the frame.

Thereafter, in step S1109, the event probability table is stored as a first event probability table in the first event probability table storage unit 904, and the decoding of the top block line is ended. In step S1109, the event probability table when the block at the right end of the top block line finished being decoded is stored.

Figure 12:
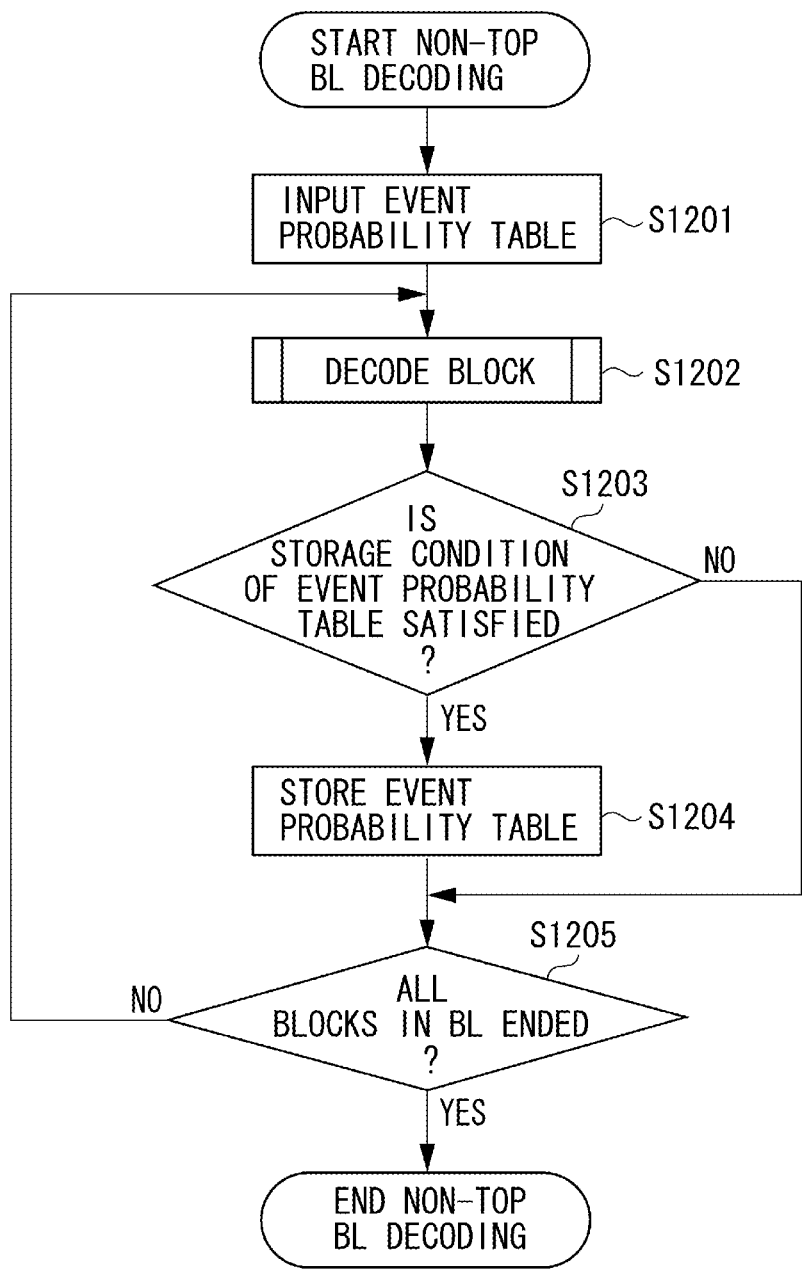
FIG. 12 is a flowchart illustrating decoding of the block lines except for the top block line in the image decoding apparatus according to the second exemplary embodiment.
Figure 13:
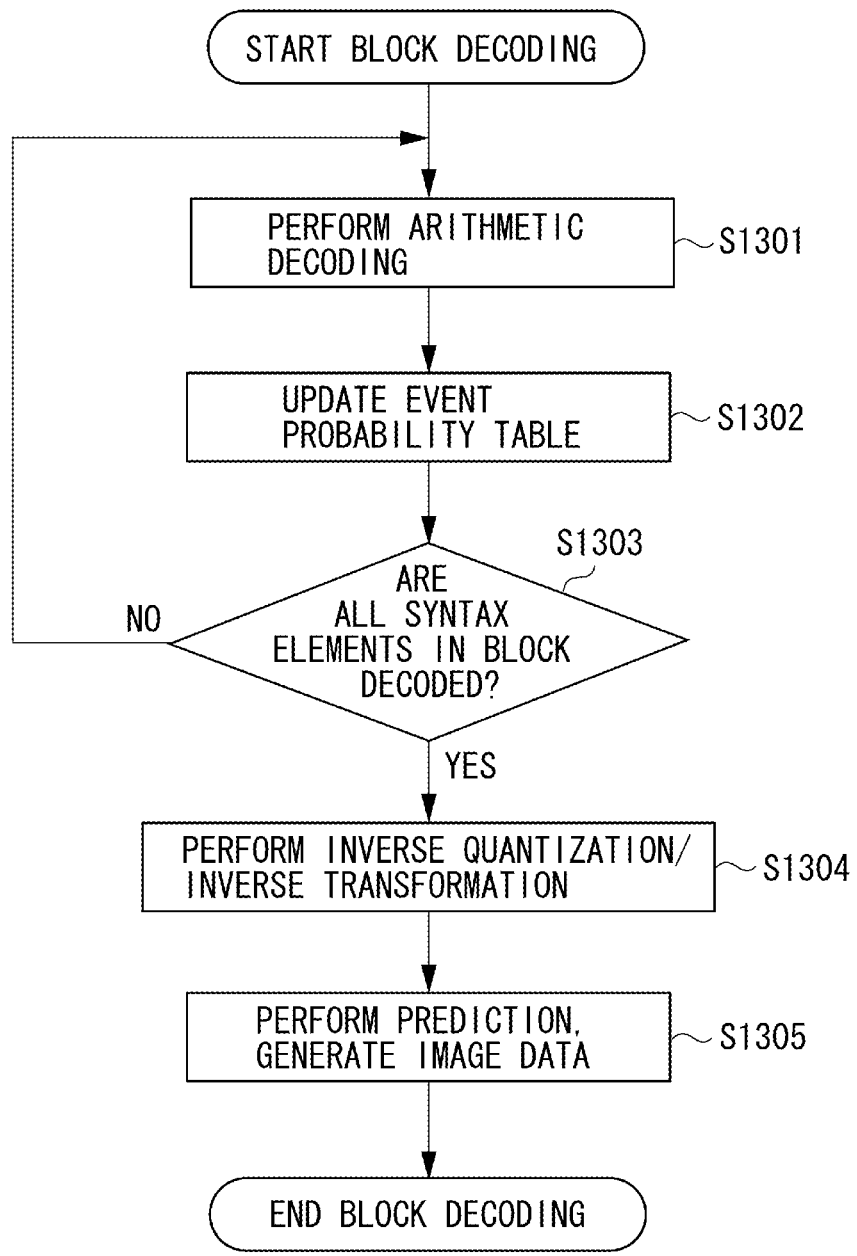
FIG. 13 is a flowchart illustrating decoding of a block in the image decoding apparatus according to the second exemplary embodiment.

The processing in step S1003 (a process of decoding other block lines, except for the top block line) will be described in detail with reference to the flowchart illustrated in FIG. 12. Whether each of the block lines is even-numbered block line is determined by the selector 901. When a block line is an even-numbered block line, the bit stream of a processing target block is input to the first decoding unit 902 and then decoded. When a block line is an odd-numbered block line, the bit stream of a target block is input to the second decoding unit 903 and then decoded. The flow when an odd-numbered block line is decoded by the second decoding unit 903 will be described first.

First, in step S1201, the first event probability table is input as a block line reference event probability table from the first event probability table storage unit 904.

Since the processing in steps S1202, S1203, and S1205 is the same as that in steps S1103, S1104, and S1107, the description is omitted.

In the processing of step S1204, an event probability table is stored as a second event probability table to the second event probability table storage unit 905. The second event probability table is used as the block line reference probability table when the block at the left end of the next block line is arithmetically decoded.

Subsequently, the flow when an even-numbered block line is decoded by the first decoding unit 902 is described.

First, in the processing of step S1201, the second event probability table is input as a block line reference event probability table from the second event probability table storage unit 905.

Since the processing in steps S1202, S1203, S1204, and S1205 is the same as that in steps S1103, S1104, S1106, and S1107, the description is omitted.

According to the configuration and operation described above, even if the number of blocks belonging to the top block line of a slice is smaller than the number of the necessary block, it is possible to decode the block at the left end of the second block line by referring to the event probability table of the block at the right end of the line at the top.

Further, in the present exemplary embodiment, when the number of blocks belonging to the top block line of a slice is smaller than the number of necessary blocks, the event probability table of the block at the right end is used as the block line reference probability table when the block at the left end of the next line is decoded. However, the present invention is not limited thereto as long as the configuration does not limit the shape of the slice. For example, when the number of blocks pertaining to the top block line of a slice is smaller than the number of necessary blocks, an event probability table that has been initialized in advance may be used as the block line reference event probability table of the next block line. In addition, when the number of blocks belonging to the top block line of a slice is smaller than the number of necessary blocks, the event probability table when an arbitrary block in the top block line of the slice is decoded may be the block line reference event probability table of the next block line. Further, it may be possible to include in advance the information about which one is the arbitrary block, as a syntax element, into the bit stream, and to determine the block line reference event probability table on the basis of the information. Further, when the number of blocks belonging to the top block line of a slice is smaller than the number of necessary blocks, both the top block line and the second block line may be integrated to be decoded by the first decoding unit 902. Similar to the encoding apparatus according to the first exemplary embodiment, FIG. 7 illustrates integration of block lines. A frame is divided into two slices in FIG. 7. The sections indicated by heavy lines are slices, in which the slice 701 is the upper slice and the slice 702 is the lower slice. The rectangles indicated by fine lines are respective blocks. The blocks in the white section are decoded by the first decoding unit 902 and the blocks in the hatched section are decoded by the second decoding unit 903. In this configuration, assuming that the storage condition number is 5 and the number of blocks in the horizontal direction of the frame is 10. The value of the difference between the number of blocks in the horizontal direction of the frame and the storage condition number is 5 and blocks more than the value are necessary in the top block line, such that the number of necessary blocks is 6. However, there are only five blocks in the top block line of the slice 702. Accordingly, by integrating the block lines, blocks included in the integrated block lines are equal to or more than the number of the necessary blocks. Further, with the integrated block lines as the top block line, the event probability table when the block corresponding to the number of necessary blocks in the order of raster is encoded may be the block line reference event probability table of the next block line. When the number of necessary blocks is 6, the event probability table when the block 703 that is the sixth block in the slice 702 in the order of raster is decoded is the block line reference event probability table of the next block line.

Although the arithmetic decoding is used for the entropy decoding in the present exemplary embodiment, the present invention is not limited thereto. Any decoding may be used as long as the statistical information in the middle of decoding a block line is used for entropy decoding of the block at the left end of the next block line when performing entropy decoding based on statistical information such as the event probability table. Further, although it is described in the present exemplary embodiment that two decoding units are provided, it is apparent that parallel processing can be performed by more decoding units by adding a third decoding unit and a third event probability table storage unit.

A third exemplary embodiment will be described. The respective processing units illustrated in FIGS. 1 and 9 are described as being configured with a hardware in the above-described exemplary embodiments. However, the processes that are performed by the processing units illustrated in FIGS. 1 and 9 may be configured with computer programs.

Figure 14:
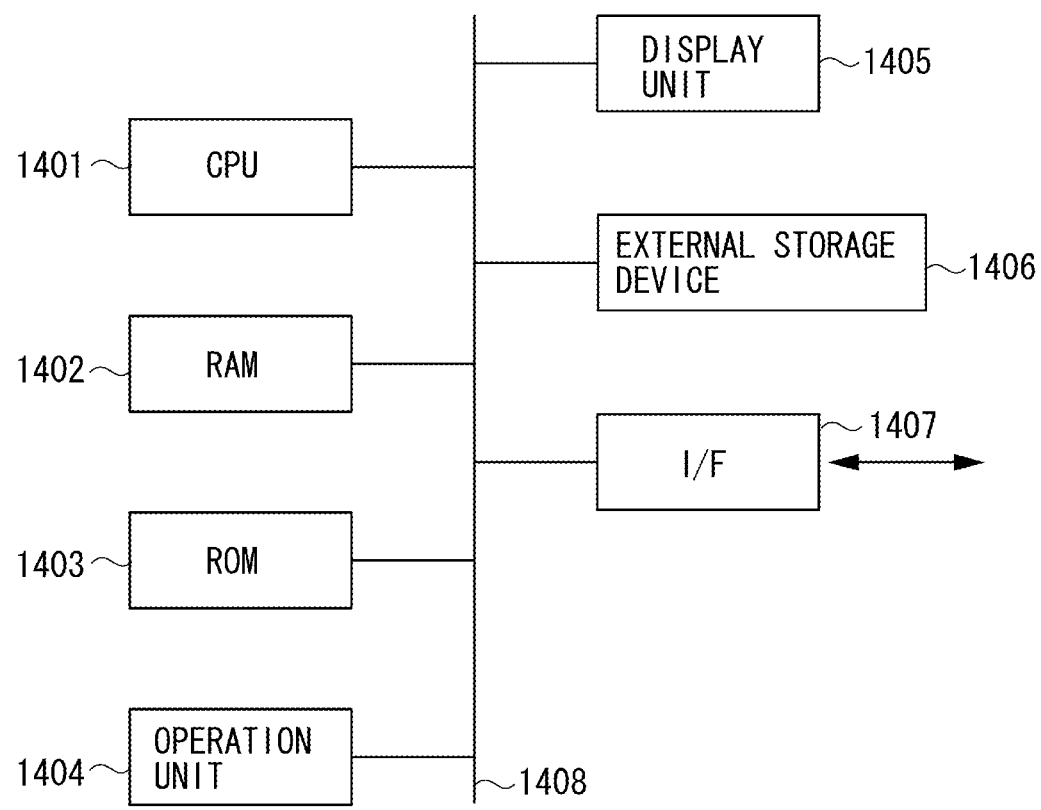
FIG. 14 is a block diagram illustrating an example of the hardware configuration of a computer which can be applied to the image encoding apparatus and the image decoding apparatus of the present invention.

FIG. 14 is a block diagram illustrating an example of the hardware configuration of a computer that can be applied to an image display device relating to each of the exemplary embodiments.

A central processing unit (CPU) 1401 performs control the entire computer using the computer program or data stored in random access memory (RAM) 1402 or read-only memory (ROM) 1403 and performs each of the processes which are described above as the processes that the image processing device performs according to the exemplary embodiment. In other words, the CPU 1401 functions as the respective processing units illustrated in FIGS. 1 and 9.

The RAM 1402 includes an area for temporarily storing computer programs or data loaded from an external memory device 1406 or data obtained from the outside through an interface (I/F) 1409. Further, the RAM 1402 includes a work area that is used when the CPU 1401 performs various processes. Specifically, the RAM 1402 may allocate, for example, a frame memory, and may appropriately provide various other areas.

The default data of the computer or the booting program is stored in the ROM 1403. An operation unit 1404 is configured with a keyboard or a mouse, and various instructions may be input to the CPU 1401 through the operation unit 1404 operated by the user of the computer. A display unit 1405 displays the processing results performed by the CPU 1401. The display unit 1405 is configured with a display device such as a liquid crystal display.

An external memory device 1406 is a large-capacity information memory device, represented by a hard disk drive. Computer programs for implementing the functions of the operating system (OS) or the respective units illustrated in FIGS. 1 and 9 on the CPU 1401 are stored in the external memory device 1406. Further, each of image data as processing targets may be stored in the external memory device 1406.

The computer program or data stored in the external memory device 1406 is appropriately loaded by the control of the CPU 1401 onto the RAM 1402 and becomes an processing target object by the CPU 1401. The I/F 1407 can connect a network such as a local area network (LAN) or the Internet, and other devices such as a projection device or a display device, such that the computer can obtain or send out various pieces of information through the I/F 1407. A bus 1408 connects the units described above.

For the operation performed by the configuration described above, the operation described with reference to the flowcharts described above is mainly controlled by the CPU 1401.

Other exemplary embodiments will be described. The present invention is also achieved by supplying a non-transitory storage medium, where the codes of computer programs for implementing the functions are stored, to a system, and by reading the codes of the computer programs with the system. In this case, the codes of the computer programs read from the storage medium implement the functions of the exemplary embodiments described above, and the present invention is configured with the non-transitory storage medium that stores the codes of the computer programs. Further, the present invention includes a case in which the OS that is executed on the computer performs some or all of the actual processes based on instructions from the codes of the programs, and the functions described above are implemented by the processes.

Further, the present invention may be implemented as follows. Specifically, computer program codes read from the non-transitory storage medium may be written onto a memory provided with a function expansion card inserted in a computer or a function expansion unit connected to the computer. Further, the present invention includes a case in which a CPU or the like provided with the function expansion card or the function expansion unit performs some or all of the actual processes based on instructions from the codes of the computer programs, and the functions are implemented.

When the present invention is applied to the non-transitory storage medium, codes of computer programs corresponding to the flowcharts described above are stored on the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-239462 filed Oct. 31, 2011, which is hereby incorporated by reference herein in its entirety.

What is claimed is:

1. An image encoding apparatus comprising:
   a division unit configured to divide an image to generate a first block group including one or more blocks and a second block group adjacent to the first block group;
   a first encoding unit configured to encode the first block group in units of block;
   a second encoding unit configured to encode the second block group in units of block; and
   a storage unit configured to store, if a block to be encoded in the first block group is at a predetermined position, first statistical information after the first encoding unit encodes the block to be encoded at the predetermined position,
   wherein the storage unit, if the first block group does not include a block at the predetermined position, stores second statistical information after the first encoding unit encodes a block in the first block group at a position different from the predetermined position, and
   wherein the second encoding unit encodes based on the first statistical information or the second statistical information.

2. The image encoding apparatus according to claim 1, wherein the storage unit, if the first block group does not include a block at the predetermined block, stores statistical information after the first encoding unit encodes a end block included in the first block group as the second statistical information.

3. The image encoding apparatus according to claim 1, wherein the storage unit, when the first block group does not include a block at the predetermined position, stores statistical information after the first encoding unit encodes a initial block included in the first block group as the second statistical information.

4. An image decoding apparatus comprising:
   a division unit configured to divide a bit stream to generate a first block group including one or more blocks and a second block group adjacent to the first block group;
   a first decoding unit configured to decode the first block group in units of block;
   a second decoding unit configured to decode the second block group in units of block; and
   a storage unit configured to store, if a block to be decoded in the first block group is at a predetermined position, first statistical information after the first decoding unit decodes the block to be decoded at the predetermined position;
   wherein the storage unit, if the first block group does not include a block at the predetermined position, stores second statistical information after the first decoding unit decodes a block in the first block group at a position different from the predetermined position, and wherein the second decoding unit decoded based on the first statistical information or the second statistical information.

5. An image encoding method for an image encoding apparatus, the method comprising:

dividing an image to generate a first block group including one or more blocks and a second block group adjacent to the first block group;

performing first encoding to encode the first block group in units of block;

performing second encoding to encode the second block group in units of block; and storing, if a block to be encoded in the first block group is at a predetermined position, first statistical information after the first encoding encodes the block to be encoded at the predetermined position, onto a storage unit, wherein the storing, if the first block group does not include a block at the predetermined position, stores second statistical information after the first encoding encodes a block in the first block group at a position different from the predetermined position, and wherein the second encoding encodes based on the first statistical information or the second statistical information.

6. An image decoding method for an image decoding apparatus, the method comprising:

dividing a bit stream to generate a first block group including one or more blocks and a second block group adjacent to the first block group;

performing first decoding to decode the first block group in units of block;

performing second decoding to decode the second block group in units of block; and storing, if a block to be decoded in the first block group is at a predetermined position, first statistical information after the first decoding the block to be decoded at the predetermined position, onto a storage unit, wherein the storing, if the first block group does not include a block at the predetermined position, stores second statistical information after the first encoding encodes a block in the first block group at a position different from the predetermined position, and wherein the second decoding decodes based on the first statistical information or the second statistical information.

7. A non-transitory computer-readable storage medium storing a program read by a computer for causing the computer to function as the image encoding apparatus according to claim 1.

8. A non-transitory computer-readable storage medium storing a program read by a computer for causing the computer to function as the image decoding apparatus according to claim 4.

9. The image encoding apparatus according to claim 1, wherein the storage unit, if the block to be encoded in the first block group is at the predetermined position which of a predetermined numbered block from the left end of the first block group, the first statistical information after the first encoding unit encodes the block to be encoded at the predetermined position.

* * * * *